(12) United States Patent
Tanaka

(10) Patent No.: US 10,031,352 B2
(45) Date of Patent: Jul. 24, 2018

(54) TIME AND TRANSPARENCY-VARYING APERTURES

(71) Applicants: SONY CORPORATION, Tokyo (JP); Sony Pictures Entertainment Inc., Culver City, CA (US)

(72) Inventor: Kazunori Tanaka, Irvine, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 15/072,150

(22) Filed: Mar. 16, 2016

(65) Prior Publication Data
US 2017/0269388 A1  Sep. 21, 2017

(51) Int. Cl.
*G02B 27/58* (2006.01)
*G02F 1/01* (2006.01)
*G03B 9/08* (2006.01)
*G03B 9/02* (2006.01)

(52) U.S. Cl.
CPC .......... *G02F 1/0121* (2013.01); *G02B 27/58* (2013.01); *G03B 9/02* (2013.01); *G03B 9/08* (2013.01)

(58) Field of Classification Search
USPC ........................................................ 396/457
See application file for complete search history.

(56) References Cited

U.S. PATENT DOCUMENTS

| 4,431,288 A | 2/1984 | Iwata et al. | |
|---|---|---|---|
| 7,019,917 B2* | 3/2006 | Sato | G02B 7/102 348/363 |
| 8,144,376 B2 | 5/2012 | Zomet et al. | |
| 8,681,245 B2* | 3/2014 | Lee | H04N 5/238 250/363.06 |
| 2003/0142276 A1* | 7/2003 | English, Jr. | G02B 5/005 353/31 |
| 2003/0228541 A1* | 12/2003 | Hsu | G03F 1/26 430/296 |
| 2005/0265714 A1* | 12/2005 | Rosdahl | H04N 5/2254 396/457 |
| 2008/0055592 A1* | 3/2008 | Nakamura | G01N 21/25 356/239.2 |
| 2008/0317459 A1* | 12/2008 | Chih | G03B 9/08 396/457 |
| 2010/0080337 A1* | 4/2010 | Seppi | G21K 1/10 378/2 |
| 2010/0188718 A1* | 7/2010 | Renaud-Goud | G02B 27/46 359/9 |
| 2010/0289994 A1* | 11/2010 | Nonaka | G02F 1/133514 349/108 |

(Continued)

OTHER PUBLICATIONS

Nagahara, H, et al., "Programmable Aperture Camera Using LCoS," ECCV'10 Proceedings of the 11th European conference on Computer vision: Part VI, pp. 337-350, Sep. 5-11, 2010.

*Primary Examiner* — Clayton E Laballe
*Assistant Examiner* — Linda B Smith
(74) *Attorney, Agent, or Firm* — Procopio, Cory, Hargreaves & Savitch, LLP

(57) ABSTRACT

System and apparatus including: a plurality of lens elements; and an aperture module coupled to the plurality of lens elements and including an array of pixels, wherein the aperture module is configured to be variable in pattern and transparency. Key words include variable aperture and pixels.

17 Claims, 5 Drawing Sheets

(56) References Cited

U.S. PATENT DOCUMENTS

2011/0058159 A1* 3/2011 Weston ............... G01B 11/007
                                                             356/237.1
2014/0168415 A1* 6/2014 Ihlenburg ............. H04N 5/2258
                                                             348/118

* cited by examiner

TIME AND TRANSPARENCY-VARYING APERTURES

BACKGROUND

Field of the Disclosure

The present disclosure relates to variable apertures, and more specifically, to time-varying and transparency-varying apertures.

Background

Typically, an iris in a lens forms an aperture that closes down to change the amount of light going through the imaging system. The iris can sometimes be completely closed to act as a shutter.

FIG. 1 is a diagram of a conventional lens system 100 including various lens or optical elements 110, 112, 114, 116 and an iris 120. In FIG. 1, the light rays 140 incident on the lens elements 110, 112 pass through the iris 120 and the lens elements 114, 116 and falls on an image sensor 142.

The blades 122 of the iris 120 form an opening or aperture 130. The shape of the iris opening (or the aperture) also affects the image rendition. Term "aperture" may be used interchangeably with "iris". In FIG. 1, the shape of the aperture may have pointed edges 124. For example, having an aperture that has pointed edges (typical of most lenses) may result in star patterns for strong light sources, or out-of-focus areas being nervously-detailed rather than having smooth bokeh. This may be undesirable for certain purposes. Thus, a round aperture, which may result in relatively round out-of-focus discs in a more pleasingly-rendered bokeh, may be desirable. Towards that goal, the lens designers often increase the number of blades to improve on the circular shape of the aperture formed by the blades. However, adding blades adds complexity to the lens system and may cause unanticipated operational problems.

Further, the bokeh is often not just a function of the aperture shape, but also of the optics. Thus, even if the aperture shape is substantially circular, the lens design itself may result in a bad bokeh. For example, a harsh bokeh is often generated when out-of-focus rings have more noticeable outer rims or rings inside the disc. To counter this problem, some lenses may include an apodisation filter near the aperture to soften the edges of the disc. An apodisation filter is similar to a neutral density filter configured to attenuate more light in areas that are farther away from the center of the aperture. However, such a filter is normally designed for one aperture size. Therefore, the filter would need to be changed as other parameters change, such as changing the aperture size, the focal length (in a zoom lens) or the focusing distance of the imaging system.

SUMMARY

The present disclosure provides for controlling variation of light attenuation by an aperture module.

In one implementation, a system is disclosed. The system includes: a plurality of lens elements; and an aperture module coupled to the plurality of lens elements and including an array of pixels, wherein the aperture module is configured to be variable in transparency for each pixel.

In another implementation, an apparatus is disclosed. The apparatus includes: a plurality of optical elements to receive incident light rays; and an array of pixels coupled to the plurality of optical elements, wherein the array pixels is configured to be variable in transparency to process the light rays.

In one implementation, a method of controlling variation in transparency of an aperture module is disclosed. The method includes: varying the effective shape and transparency of the aperture module by controlling an array of pixels; determining desired variation of the effective shape and transparencies over a fixed period of time; controlling the array of pixels to keep the shape and transparency fixed over the fixed period of time if it is determined that the desired transparencies is fixed; and controlling the array of pixels to vary the shape and transparency over the fixed period of time if it is determined that the desired transparencies are variable.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, increasing the number of aperture blades to improve on the shape of the aperture can add complexity to the lens system and may cause unanticipated operational problems. Further, adding an apodisation filter to counter a harsh bokeh problem may only address issues for one aperture size. Accordingly, there is a need for a filter that can provide a variable modification for the light throughput.

After reading these descriptions, it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

In one implementation, an aperture module disposed in place of or in addition to an existing iris/aperture is configured in a system. In one implementation, the system is a lens system. In another implementation, the system is an imaging system. In a further implementation, the system is any system that includes an aperture. In one implementation, the aperture module can be varied in time and transparency for each local element, which could effectively have the result of changing the shape of the aperture (hereafter referred to as "shape"). Thus, it should be noted that term "changes in shape of the aperture" is referring to modulating the light that goes through the aperture layer by varying the transparency of sensels so that the aperture layer forms a "pattern" or "shape".

Figure 2:
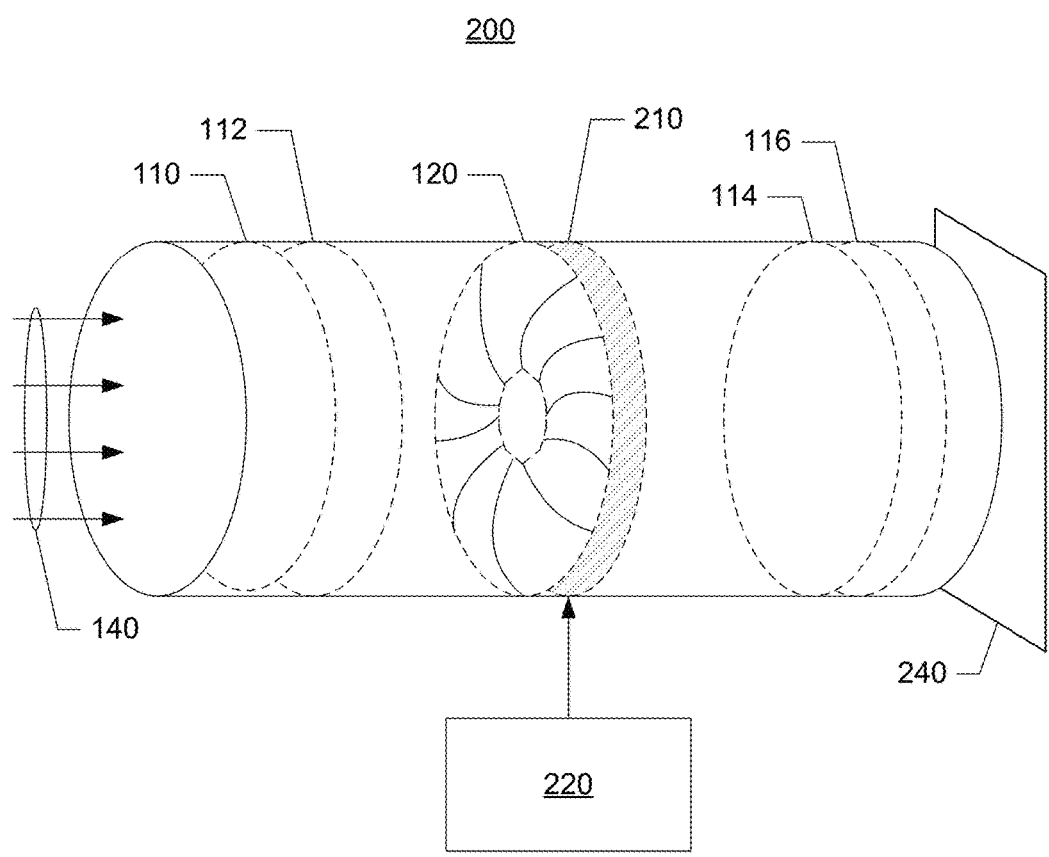
FIG. 2 is a diagram of a lens system in accordance with one implementation of the present disclosure.

FIG. 2 is a diagram of a lens system 200 in accordance with one implementation of the present disclosure. In the illustrated implementation of FIG. 2, the lens system 200 includes an iris 120 and an aperture module 210. The lens system 200 also includes various lens elements 110, 112, 114, 116. In one implementation, the lens system 200 further includes a controller 220 configured to control the variation of the shape and/or transparency of the aperture module 210. In one implementation, the shape and/or transparency of the aperture module 210 is fixed over a fixed period of time. In another implementation, the shape and/or transparency of the aperture module 210 is varied over time.

In FIG. 2, the light rays 140 incident on the lens elements 110, 112 pass through the iris 120, the aperture module 210, the lens elements 114, 116 and falls on an image sensor 240. In one implementation, the aperture module 210 includes an array of pixel elements configured to be variable in transparency to process the light rays.

Figure 1:
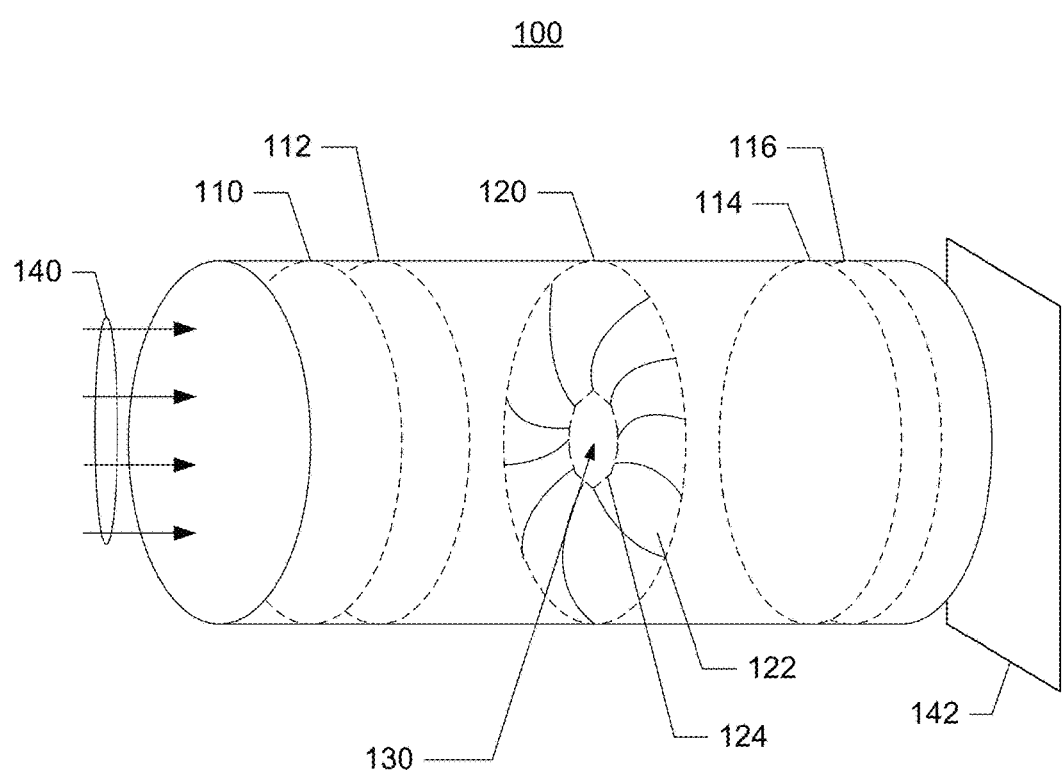
FIG. 1 is a diagram of a conventional lens system including various lens elements and an iris.
Figure 3:
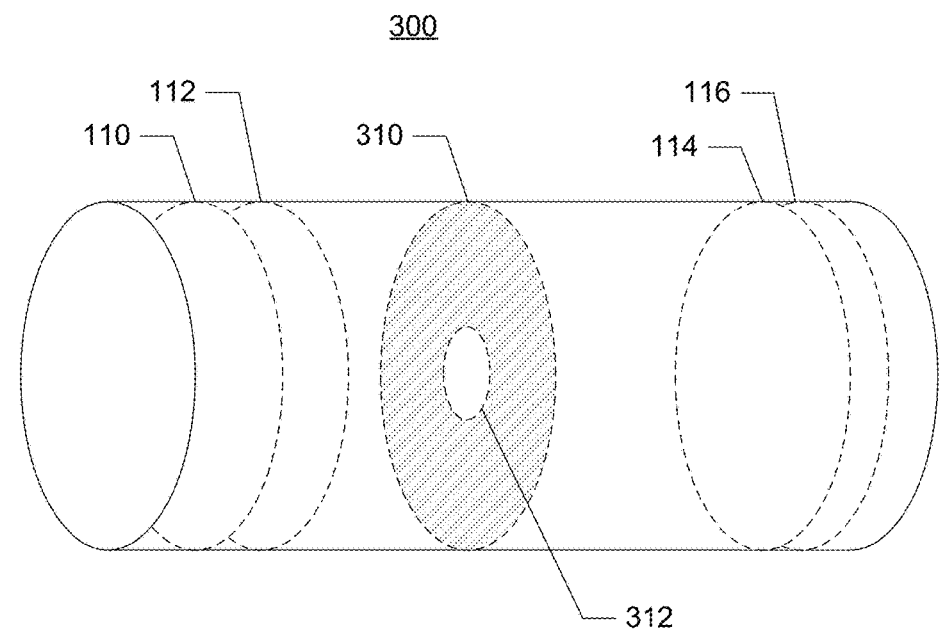
FIG. 3 is a diagram of a lens system in accordance with another implementation of the present disclosure.

FIG. 3 is a diagram of a lens system 300 in accordance with another implementation of the present disclosure. The lens system 300 may include an aperture module 310 in place of the iris 120 shown in FIGS. 1 and 2. In the illustrated implementation of FIG. 3, the aperture module 310 includes a variable aperture 312 which is substantially circular compared to the aperture 124 of the conventional iris 120 of FIG. 1. The lens system 300 also includes various lens elements 110, 112, 114, 116.

In one implementation, the aperture module 210, 310 of FIG. 2 or FIG. 3 is configured as a liquid crystal display (LCD) array of pixel elements arranged in a row-column configuration. In another implementation, the aperture module 210 is configured as an LCD array of pixel elements arranged in concentric rings. The LCD array of pixel elements can be controlled such that the aperture module 210, 310 is varied in time, shape, and transparency. In one implementation, the pixel elements are independently varied in transparency to turn on or off the aperture at different locations in module 210, 310 at different times. In another implementation, the transparency of some of the pixel elements is varied to change the light attenuation of the aperture module at different locations in module 210, 310 at different times.

Figure 4:
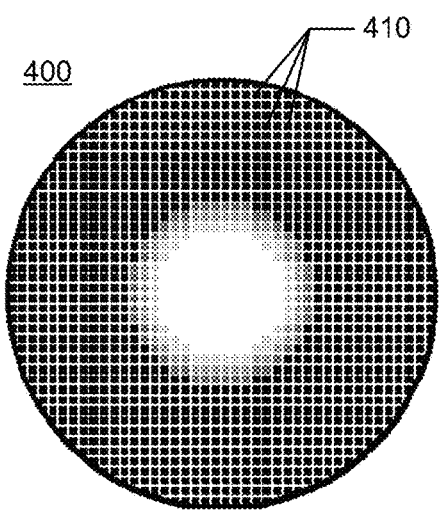
FIG. 4 is a diagram of an aperture module in accordance with one implementation of the present disclosure.
Figure 5:
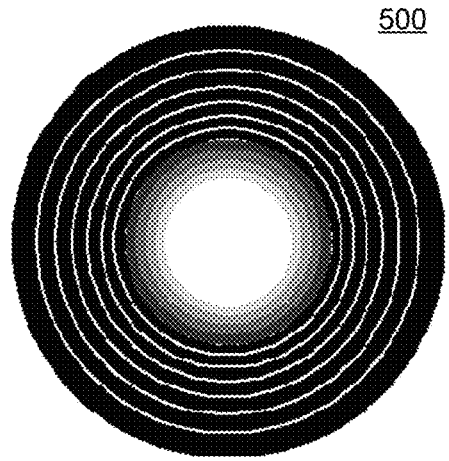
FIG. 5 is a diagram of an aperture module in accordance with another implementation of the present disclosure.

In one implementation shown in FIG. 4, the LCD pixel elements 410 are programmed to generate more pleasant bokeh by designing the aperture module 400 as an apodisation filter. FIG. 5 shows the aperture module 500 with the pixel elements arranged like concentric rings. Since the pattern and transparency can be varied, the aperture module 400, 500 can be designed as an apodisation filter for any aperture size.

Figure 6:
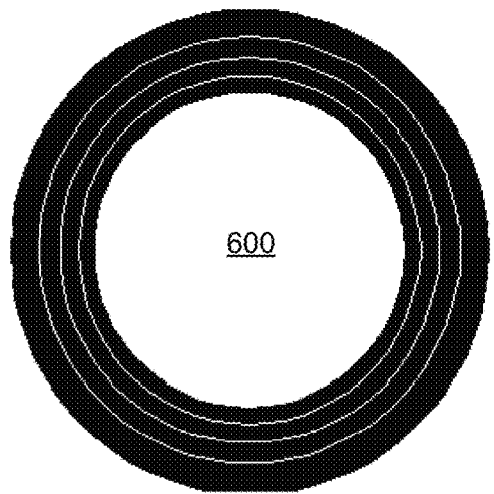
FIG. 6 shows an aperture module with pixel elements arranged like concentric rings and designed to have a large aperture.
Figure 7:
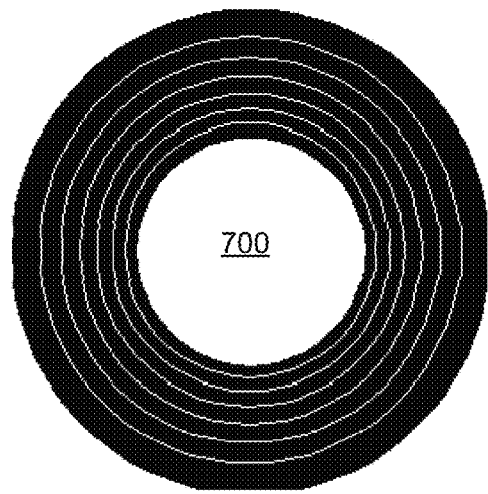
FIG. 7 shows an aperture module with pixel elements arranged like concentric rings and designed to have a medium-sized aperture.

FIG. 6 shows the aperture module 600 with pixel elements arranged like concentric rings and designed to have a large aperture. FIG. 7 shows the aperture module 700 with pixel elements arranged like concentric rings and designed to have a medium-sized aperture.

Figure 8:
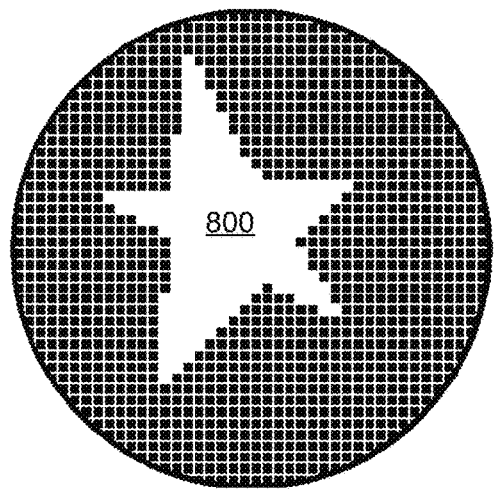
FIG. 8 shows an aperture module designed into an arbitrary star shape.

The patterns can be dynamically varied or pre-programmed with different shapes and stored in a storage unit. Different patterns for the aperture module creates different look and feel for the bokeh. For example, to get a certain look, different zoom lengths or focusing parameters may require variations on the pattern. Further, the shape of the aperture module can be designed like cookie cutters to make out-of-focus discs appear in that shape (e.g., hearts, stars, or dinosaurs). FIG. 8 shows the aperture module 800 designed into an arbitrary star shape.

In some implementations, the aperture module can be patterned so that all pixel elements are designed to be opaque and used as a shutter. Since the duration of the aperture opening/closing can be changed electronically, the performance of the aperture module as a shutter would surpass the limitations imposed by the physical shutter. Further, since the electronic shutter configured with the aperture module is very quiet, the absence of vibration provides substantial reduction in image degradation or noise.

In some implementations, the aperture module can be patterned so that all pixel elements are similarly semi-transparent so as to be used as a neutral density filter.

In other implementations, the pattern (including transparencies) of the pixel elements of the aperture module is varied over time. This could enable fade-in or fade-out exposures. For example, by controlling the variation of the transparency over time, lights of a car at night can be shown as either getting brighter tailing the car or going ahead of the movement of the car. For example, the pattern can be changed so the light is a star at the end, but is a round disc at all other times. In another implementation, the size of the aperture changes so that if the camera zooms during its exposure, the out-of-focus areas change from smaller to larger or vice versa. In yet another implementation, the aperture module is used to fade in and out in a wave pattern. In a further implementation, multi-exposure shots can be taken by using the aperture module as a shutter that is open at certain times.

Figure 9:
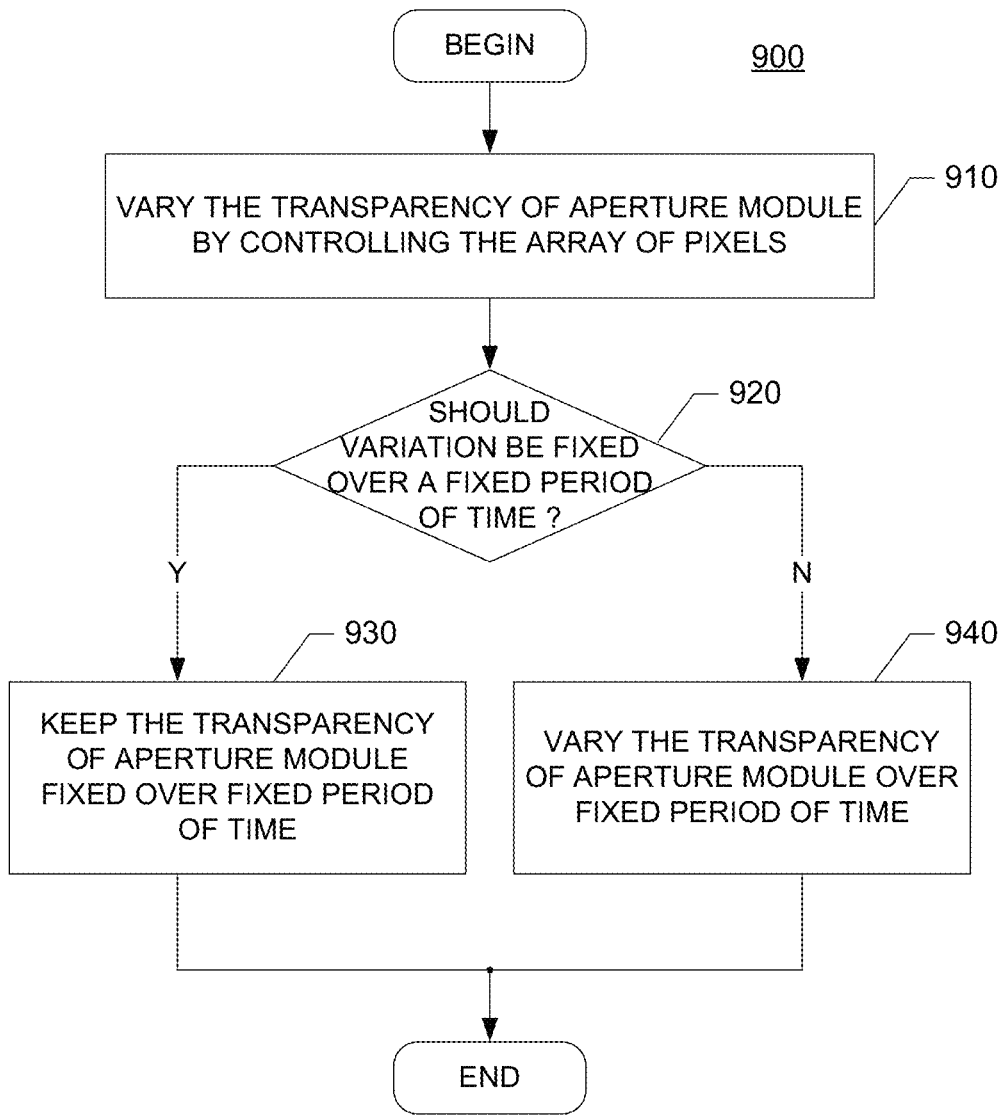
FIG. 9 is a flow diagram illustrating a process for controlling variation of the shape and transparency of the aperture module in accordance with one implementation of the present disclosure.

FIG. 9 is a flow diagram illustrating a process 900 for controlling variation of the shape and transparency of the aperture module in accordance with one implementation of the present disclosure. In the process 900, the transparency of the aperture module is varied, at block 910, by controlling the array of pixels. In one implementation, the array of pixels is arranged in concentric circles. The array of pixels arranged in the concentric circles can be used to form an apodisation filter. A determination is made, at block 920, whether the variation of the transparency should be fixed over a fixed period of time. If it is determined, at block 920, that the variation of the transparency should be fixed over a fixed period of time, then the transparency of the aperture module is fixed over a fixed period of time, at block 930. Otherwise, if it is determined, at block 920, that the variation of the transparency should be variable over a fixed period of time, then the transparency of the aperture module is varied over the fixed period of time, at block 940.

The foregoing methods and apparatus are susceptible to many variations. For example, although the specification describes an aperture module or apparatus within the context of a lens or imaging system, the aperture module can be used in any system that includes an aperture. Additionally, for clear and brief description, many descriptions of the methods and apparatus have been simplified. Many descriptions use terminology and structures of specific standards. However, the disclosed methods and apparatus are more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system comprising:
a plurality of lens elements;
an aperture module coupled to the plurality of lens elements and including an array of pixels,
wherein the aperture module is configured to be variable in pattern and transparency over time for each pixel,
wherein variation in transparency is used to provide fade-in or fade-out exposures; and
a controller configured to control the variation of the pattern and transparency of the aperture module over time.

2. The system of claim 1, wherein the controller controls the variation of the pattern and transparency to be fixed over a fixed period of time.

3. The system of claim 1, wherein the controller controls the variation of the pattern and transparency to be variable over time.

4. The system of claim 1, wherein the controller varies the pattern and transparency of the aperture module by controlling the array of pixels.

5. The system of claim 1, wherein the controller controls the array of pixels to enable the aperture module to act as a shutter by turning all pixels to opaque or transparent.

6. The system of claim 1, wherein the array of pixels are arranged in concentric circles of variable aperture.

7. The system of claim 6, wherein the array of pixels arranged in the concentric circles forms an apodisation filter.

8. The system of claim 6, wherein the array of pixels arranged in the concentric circles is controlled to provide a variable aperture.

9. An apparatus comprising:
a plurality of optical elements to receive incident light rays;
an array of pixels coupled to the plurality of optical elements,
wherein the array of pixels is configured to be variable in pattern and transparency over time to process the light rays; and
a controller configured to control variation of the pattern and transparency of the aperture module over time,
wherein variation in transparency is used to provide fade-in or fade-out exposures.

10. The apparatus of claim 9, wherein the array of pixels are arranged in concentric circles of variable aperture.

11. The apparatus of claim 10, wherein the array of pixels arranged in the concentric circles forms an apodisation filter.

12. The apparatus of claim 10, wherein the array of pixels arranged in the concentric circles is controlled to provide a variable aperture.

13. A method of controlling variation of pattern and transparency of an aperture module, the method comprising:
varying the pattern and transparency of the aperture module by controlling an array of pixels;
determining desired variation of the pattern and transparency over a fixed period of time;
controlling the array of pixels to keep the pattern and transparency fixed over the fixed period of time for each pixel of the array of pixels if it is determined that the desired variation is fixed; and
controlling the array of pixels to vary the pattern and transparency over the fixed period of time for each pixel of the array of pixels if it is determined that the desired variation is variable,
wherein variation in transparency is used to provide fade-in or fade-out exposures.

14. The method of claim 13, further comprising arranging the array of pixels in concentric circles.

15. The method of claim 13, wherein the array of pixels arranged in the concentric circles forms an apodisation filter.

16. The method of claim 13, wherein the array of pixels arranged in the concentric circles is controlled to provide a variable aperture.

17. The method of claim 13, further comprising controlling the array of pixels to enable the aperture module to act as a shutter by turning all pixels to opaque or transparent.

\* \* \* \* \*